United States Patent [19]
Becker

[11] Patent Number: 4,559,069
[45] Date of Patent: Dec. 17, 1985

[54] INTEGRATED FRACTIONAL CONDENSATION SYSTEM FOR THE PURIFICATION OF SEPARATE CRUDE GAS STREAMS

[75] Inventor: Hans Becker, Munich, Fed. Rep. of Germany

[73] Assignee: Linde Aktiengesellschaft, Wiesbaden, Fed. Rep. of Germany

[21] Appl. No.: 555,908

[22] Filed: Nov. 29, 1983

[30] Foreign Application Priority Data

Nov. 29, 1982 [DE] Fed. Rep. of Germany ....... 3244143

[51] Int. Cl.$^4$ ................................................ F25J 3/00
[52] U.S. Cl. .......................................... 62/11; 62/23
[58] Field of Search .................... 62/9, 11, 23, 16, 25, 62/26, 29, 38, 39

[56] References Cited

U.S. PATENT DOCUMENTS

4,242,875  1/1981  Schaefer .................................. 62/23

Primary Examiner—Frank Sever
Attorney, Agent, or Firm—Millen & White

[57] ABSTRACT

Several impure gaseous streams, e.g., hydrogen-containing streams from a hydrogenation system, under different pressures and consisting essentially of the same components, are purified by multistage fractional condensation. The condensates separated from the gaseous streams at higher pressures are expanded to the lower pressure of another gaseous stream and introduced into the latter.

15 Claims, 1 Drawing Figure

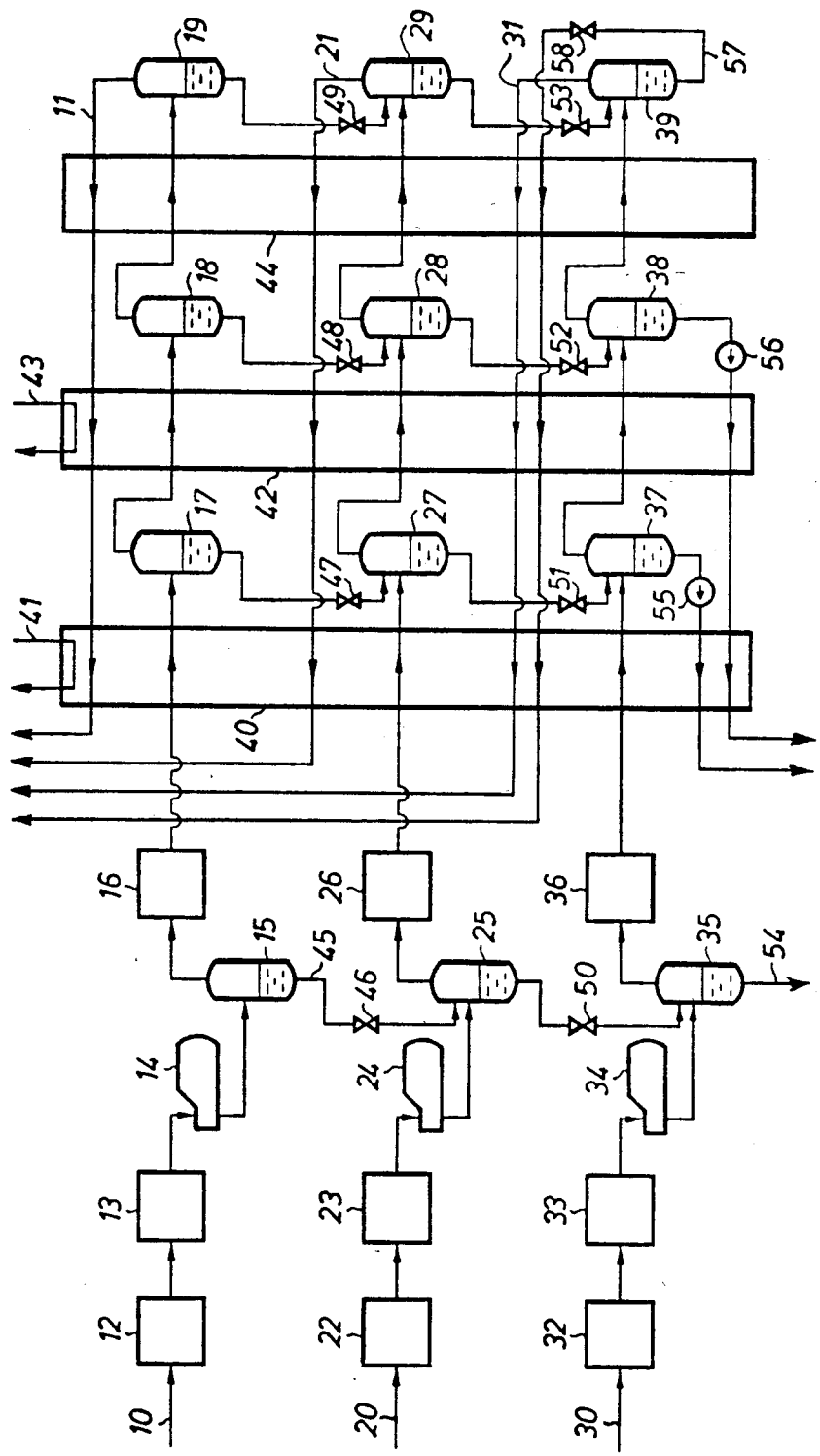

INTEGRATED FRACTIONAL CONDENSATION SYSTEM FOR THE PURIFICATION OF SEPARATE CRUDE GAS STREAMS

BACKGROUND OF THE INVENTION

This invention relates to a process for the separation of gaseous streams under elevated pressures by means of fractional condensation.

The separation of gaseous streams by fractional condensation is utilized on an industrial scale for obtaining different boiling point fractions. Such a process is described, for example, in "Linde-Berichte aus Technik und Wissenschaft" [Linde Reports on Science and Technology] 45:9 (1979). In this conventional process, hydrocarbon fractions and recycle hydrogen are obtained from a Fischer-Tropsch synthesis cycle; for this purpose, the crude gas is cooled in stages to provide separate recoverable hydrocarbon condensates. By arranging the condensation stages at suitable temperature levels, it is possible to obtain fractions of a desired composition.

In complex large-scale chemical plants, it is often necessary to purify or fractionate a plurality of gaseous streams containing essentially the same components, but not necessarily in the same concentrations. Furthermore, such individual gaseous streams are also generally obtained at different pressure levels, and process conditions dictate that the purified or fractionated streams are recycled, at least in substantial portions, at these same pressure levels. To comply with these criteria, alternatives have been employed for the processing of the various gaseous streams: On the one hand, the gaseous streams can be combined and processed together at a suitable pressure level and the purified gaseous stream can then be restored to the suitable pressure, optionally after having been divided, and then conducted to its respective destination; or, alternatively, mutually independent and distinct separation facilities can be utilized for each process stream. Combined processing is disadvantageous especially when working up gaseous streams having widely different pressures, since significant compression energy must be expanded for adapting the individual process streams to a common pressure level for the purifying steps, either by compression of crude gas introduced under low pressure or by recompression of expanded high-pressure gas. Conversely, the use of independent and distinct separation facilities for each process stream is costly insofar as the advantage of scale is lost. Furthermore, in both procedures, the recovery of valuable light components, e.g., hydrogen, should be conducted in an economical manner, and in this connection there is ample room for increased yields.

SUMMARY

An object of this invention is to provide a process of the type discussed above whereby the individual components can be obtained separately from one another in a simple manner and with a maximally high yield.

Upon further study of the specification and appended claims, further objects and advantages of this invention will become apparent to those skilled in the art.

These objects are attained by a process for the purification of a plurality of separate impure gaseous streams having different pressure levels and consisting essentially of the same components, said process comprising subjecting each of said gaseous streams to separate multistage fractional condensation under the respective pressure of each stream; separating resultant condensates from each gaseous stream; expanding at least one condensate from a gaseous stream at a higher pressure to a lower pressure of another gaseous stream, and introducing the resultant expanded fluid into said lower pressure other gaseous stream.

In the process of this invention, the individual gaseous streams are processed separately from one another, thereby incurring additional expenditures in apparatus compared with processing in a single installation. However, this disadvantage is generally more than compensated for by the possibility of effecting purification and/or separation under the most economically favorable process conditions. In the process of this invention, there is the additional possibility of obtaining the lightest component in an especially high yield. This increase in yield results from the cascading of the separated condensates from higher pressure stages into respectively lower pressure stages. This cascading, taking place preferably into the respectively next-lower pressure stage, provides an at least partial gas-phase removal of light components previously dissolved in the condensate at the respectively higher pressure stage. These components are therefore additionally recovered, even though at a lower pressure level, and lead to an increase in yield.

BRIEF DESCRIPTION OF DRAWING

The attached drawing is a schematic flowsheet of a preferred embodiment of the invention.

DETAILED DESCRIPTION

The preferred embodiment relates to a high-pressure hydrogenation system, for example the hydrogenation of liquid or solid, carbon-containing starting materials for the production of lower-boiling liquid products. Such hydrogenation reactions are generally conducted with a considerable excess of high pressure hydrogen, and for reasons of process economics, the excess hydrogen is recycled. Prior to recycling this high pressure hydrogen into the hydrogenation stage, purification is required because the excess hydrogen has contaminants consisting essentially of gaseous by-products of the hydrogenation. Also, in the purification of the reaction products, there are also recovered contaminated hydrogen fractions at a medium pressure level as well as at a low pressure level.

The three crude gas streams are conducted into three parallel-running purification lines via conduits 10, 20 and 30 under pressures of about 300 bar in conduit 10, about 55 bar in conduit 20, and about 25 bar in conduit 30. The impure high-pressure stream, after an expansion to, for example, 80 bar that may be necessary to be within the pressure limitations of the plant, is conducted to a purifying stage 12 wherein ammonia contained in the gas is removed and thereafter to a scrubbing stage 13 for the removal of sour gases. The thus-prepurified gas then enters a first heat exchanger 14 wherein it is cooled to a temperature of between 5° and 20° C. During this step, water and higher hydrocarbons (e.g., $C_5$ and higher) are extensively condensed and thereafter removed in phase separator 15. The remaining gas is freed in dryer 16 of the last traces of water vapor which would otherwise interfere in the low-temperature separation section. Thereafter, the high pressure gas is cooled in heat exchanger 40 against process streams to be warmed as well as against a refrigeration cycle, for example, a multistage $C_3$-refrigeration cycle illustrated schematically by conduit 41. After the high pressure gaseous stream is cooled to a temperature of between about $-30°$ and $-40°$ C., the newly formed condensate consisting essentially of $C_3$-hydrocarbons is separated in phase separator 17. The remaining gas is conducted through the heat exchanger 42 wherein further cooling takes place in heat exchange against cold process streams and a refrigeration cycle indicated by conduit 43. In this case, the refrigeration cycle 43 can consist, for example, of a multistage $C_2$-cycle whereby cooling of the gaseous stream can be achieved to temperatures of between about $-90°$ and $-100°$ C. The condensate formed during this further cooling is separated in phase separator 18 from the proportion that has remained in the gaseous phase, the latter consisting essentially of only hydrogen, methane, and other very readily volatile components. The latter gaseous phase is then passed to a last heat exchanger 44 wherein it is cooled against cold process streams to such an extent that the uncondensed fraction, which is finally separated in phase separator 19, exhibits the desired hydrogen purity (e.g., generally about at least 90% $H_2$). The high-pressure hydrogen purified in this way is withdrawn via conduit 11 and recycled to the hydrogenation stage after being heated in heat exchangers 44, 42 and 40, and optionally recompressed.

Purification of the medium- and low-pressure streams, fed respectively via conduits 20 and 30, is conducted in the same way in parallel-operated purification stages. The features corresponding to the above-described structural components 11–19 are indicated for the stream fed via conduit 20 by numerals 21–29 and for the low-pressure stream fed via conduit 30 by numerals 31–39.

The condensates separated from the high-pressure stream are introduced into the medium-pressure stream. For this purpose, the condensate withdrawn from phase separator 15 via conduit 45 is expanded (i.e. pressure reduced generally to form gaseous and liquid phases) in valve 46 to the medium pressure and conducted into phase separator 25 operated at the same temperature level as separator 15. Correspondingly, the condensates from phase separators 17, 18 and 19, after respective expansion, are expanded to the medium pressure in valves 47, 48, 49 and thereafter fed into the phase separators 27, 28 and 29, respectively. The light components dissolved in the condensates of the high-pressure stream are largely separated in gaseous form during expansion to medium pressure and can thereby be introduced into the purified medium-pressure gas stream 21 as an increase in yield.

The condensates separated in phase separators 25, 27, 28 and 29 from the medium-pressure stream are expanded in an entirely analogous manner in valves 50, 51, 52 and 53, respectively, to the pressure of the low-pressure stream and fed into phase separators 35, 37, 38 and 39, respectively. The hydrogen removed in the gaseous phase from the condensates during expansion is thus recovered in conduit 31 in the purified gaseous stream, thereby resulting in an additional increased yield of hydrogen.

Via conduit 54, a condensate containing water and heavy hydrocarbons is separated from the separator 35 arranged in the low-pressure stream and can be introduced into a separation installation, not shown, for obtaining individual hydrocarbon fractions. The condensates rich in $C_3$- and $C_2$-hydrocarbons, respectively, separated in separators 37 and 38, are conducted by means of pumps 55 and 56, respectively, through heat exchanger 40 and through heat exchangers 42 and 40, respectively, whereupon these fractions can be forwarded, for example, to another processing operation. The liquid fraction obtained in separator 39 is finally withdrawn via conduit 57, expanded in valve 58, and after being warmed in heat exchangers 44, 42 and 40, is withdrawn as a heating gas fraction.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for the purification of a plurality of separate impure gaseous streams, each stream having a different total pressure and consisting of the same components, said process minimizing compression energy over combined processing facilities while maintaining a processing advantage over independent and distinct separation facilities by the steps comprising subjecting each of said gaseous streams to a separate multistage fractional condensation operation under the respective pressure of each stream; separating resulting condensates from each gaseous stream; expanding at least one condensate from a gaseous stream at a higher pressure to a lower pressure of another gaseous stream, and introducing resultant expanded fluid into said lower pressure gaseous stream, and subjecting the resultant mixture of streams to at least one stage of at least one of said multistage fractional condensation operations.

2. A process according to claim 1, wherein a plurality of resultant expanded fluids are introduced into the respectively next-lower pressure stage.

3. A process according to claim 2, wherein a plurality of resultant expanded fluids are conducted into phase separators for separation of condensates from a lower pressure stage.

4. A process according to claim 3, wherein said impure gaseous streams contain hydrogen and impurities.

5. A process according to claim 2, wherein said impure gaseous streams contain hydrogen and impurities.

6. A process according to claim 2, wherein each condensate from each stage of at least one of said multistage fractional condensation operations is introduced into the respectively next-lower pressure stage.

7. A process according to claim 6, wherein each of the resultant expanded condensates is conducted to a separate phase separator for the separation of condensate.

8. A process according to claim 7, wherein in each of said separate phase separators, the resultant expanded condensate is mixed with a lower pressure gaseous stream and the resultant gaseous streams are subjected to a plurality of stages of said at least one of said multistage fractional condensation operations.

9. A process according to claim 8, wherein said resultant gaseous streams are subjected to a plurality of stages in a plurality of multistage fractional condensation operations.

10. A process according to claim 1, wherein a plurality of resultant expanded fluids are conducted into phase separators for separation of condensates from a lower pressure stage.

11. A process according to claim 10, wherein said impure gaseous streams contain hydrogen and impurities.

12. A process according to claim 1, wherein said impure gaseous streams contain hydrogen and impurities.

13. A process according to claim 12, wherein the impure hydrogen-containing streams are derived from a hydrogenation stage.

14. A process of claim 1, wherein said at least one stage comprises a plurality of stages.

15. A process according to claim 1, wherein said at least one stage of at least one of said multistage fractional condensation operations comprises a plurality of stages in a plurality of said fractional condensation operations.

* * * * *